L. R. RHOADES.
ELECTRIC BATTERY.
APPLICATION FILED DEC. 18, 1915.
1,205,392.
Patented Nov. 21, 1916.
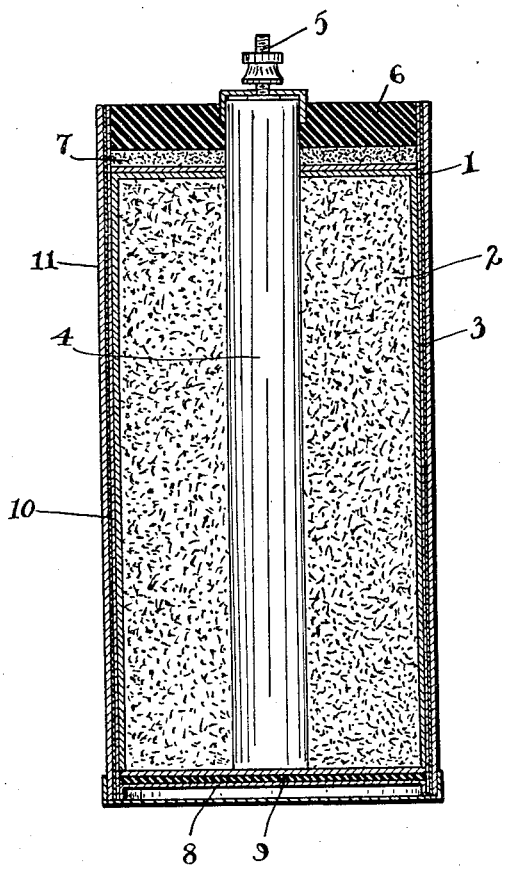
WITNESS
H. G. Grover
INVENTOR.
LLOYD R. RHOADES
BY Ira J. Adams
ATTORNEY

UNITED STATES PATENT OFFICE.

LLOYD R. RHOADES, OF FREMONT, OHIO, ASSIGNOR TO NATIONAL CARBON COMPANY, A CORPORATION OF NEW JERSEY.

ELECTRIC BATTERY.

1,205,392.  Specification of Letters Patent.  Patented Nov. 21, 1916.

Application filed December 18, 1915. Serial No. 67,517.

*To all whom it may concern:*

Be it known that I, LLOYD R. RHOADES, a citizen of the United States, residing at Fremont, in the county of Sandusky and State of Ohio, have invented a certain new and useful Improvement in Electric Batteries, of which the following is a full, clear, and exact description.

My invention relates to electric batteries and is especially applicable to the type commonly called "dry cells."

It has been the almost universal practice to place the dry cell contents in a zinc can which acts both as the positive electrode and the container. To prevent short circuits the zinc can of the completed dry cell has been placed in a loose fitting cardboard jacket on which is printed the name of the manufacturer and other information.

Heretofore more or less difficulty has been experienced in constructing the dry cells so that the zinc would not corrode through in certain parts before the cell was exhausted. This not only depleted the cell of electrolyte through loss of water by evaporation, but also moistened the jackets and caused short circuits when a plurality of cells have been connected together.

My invention aims to overcome these difficulties by producing a waterproof container which will permit the use of thinner zincs and eliminate the disadvantages heretofore experienced with leaky cans. The manner in which this is accomplished is described in the appended specification with reference to the drawing in which the single figure is a cross sectional view of a dry cell embodying the invention.

Referring to the drawing, the zinc can 1 contains a battery mix 2 from which it may be separated by an appropriate bibulous lining 3. A carbon electrode 4 is located in the mix and has the usual binding post 5 attached to the end protruding through the seal 6. Between the seal 6 and the mix may be placed the usual absorbent 7 of bibulous paper, sand, etc. The bottom 8 of the zinc can is separated from the mix by one or more layers 9 of paper or pitch or both.

Either after or before placing the dry cell contents in the zinc, the latter is wrapped with a thin layer 10 of waterproof paper, or dipped in pitch or tarry material, or provided with a layer of some other suitable material which in combination with the jacket will prevent the electrolyte from leaking out of the zinc when it is corroded through. The next step in the process of constructing the cell is to wrap snugly around the zinc a sheet 11 of wet cardboard, chipboard or other form of paper, having a coating of a suitable paste or other adhesive which will hold the jacket together. When the cardboard dries out it shrinks and binds the waterproof paper or other suitable material tightly against the zinc. The cell is then ready for shipment. Cells constructed in this way have proven to be very strong mechanically and quite waterproof. In fact, I have used the improved form of jacket on dry cells with only substantially enough zinc to theoretically produce the desired electric energy, and when these cells have been exhausted in service it has been found that the entire zinc can was consumed throughout its entire surface, and yet no electrolyte was able to reach the cell jacket.

The invention can be used with zinc cans of any thickness, as it waterproofs the same regardless of the gage of zinc used; but since it prevents the electrolyte from leaking it is especially valuable in making dry cells with thin zincs, which reduces considerably the cost of manufacture without in any way lowering the quality of the cells. Of course it is not essential that the waterproof material be added to the zinc, as it can be attached or applied to the jacket. In shrinking, the jacket would bind the waterproof material against the zinc as previously described. In place of paper other materials may be used for the jacket, provided they have the property of shrinking upon drying out.

Having described my invention, what I claim is:—

1. In electric batteries, a zinc electrode containing an electrolyte, a layer of waterproof material and a jacket shrunk around said waterproof material to bind tightly against the zinc.

2. In electric batteries, a zinc electrode containing an electrolyte, a sheet of waterproof paper around the zinc electrode and a cardboard jacket shrunk on said sheet of paper.

In testimony whereof, I hereunto affix my signature.

LLOYD R. RHOADES.